(12) United States Patent
Mukasa

(10) Patent No.: US 7,693,378 B2
(45) Date of Patent: Apr. 6, 2010

(54) HOLEY FIBER AND METHOD OF MANUFACTURING THE SAME

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 30 days.

(21) Appl. No.: 12/170,822

(22) Filed: Jul. 10, 2008

(65) Prior Publication Data
US 2009/0034926 A1 Feb. 5, 2009

(30) Foreign Application Priority Data
Jul. 19, 2007 (JP) ............................. 2007-188200

(51) Int. Cl.
G02B 6/032 (2006.01)
B29D 11/00 (2006.01)

(52) U.S. Cl. ...................... 385/125; 264/1.24

(58) Field of Classification Search ................. None
See application file for complete search history.

(56) References Cited

U.S. PATENT DOCUMENTS

2006/0062533 A1* 3/2006 Hachiwaka et al. ......... 385/125
2006/0067632 A1* 3/2006 Broeng et al. ................. 385/96
2006/0204195 A1* 9/2006 Kurosawa et al. ........... 385/125

OTHER PUBLICATIONS

K.Tajima et al, "Low Water Peak Photonic Crystal Fibres", ECOC'03 PD, Th4. 16, 2003, 2 pages.
U.S. Appl. No. 12/129,257, filed May 29, 2008, Mukasa, et al.
U.S. Appl. No. 12/131,355, filed Jun. 2, 2008, Mukasa.
U.S. Appl. No. 12/406,592, filed Mar. 18, 2009, Mukasa.

* cited by examiner

Primary Examiner—Michelle R Connelly Cushwa
(74) Attorney, Agent, or Firm—Oblon, Spivak, McClelland, Maier & Neustadt, L.L.P.

(57) ABSTRACT

A holey fiber has a core region, a cladding region surrounding the core region, air holes arranged around the core region, and a connection section extending from at least one end portion of the holey fiber. A refractive index of the core region in the connection section is higher than a refractive index of the cladding region without air holes in the connection section.

6 Claims, 8 Drawing Sheets

| CONFINEMENT LOSS [dB/km] | CHROMATIC DISPERSION [ps/nm/km] | DISPERSION SLOPE [ps/nm²/km] | Aeff [μm²] | BENDING LOSS [dB/m(20 mm φ)] |
|---|---|---|---|---|
| <0.001 | 28.0 | 0.0681 | 114.6 | 1.6 |

FIG.12

| | TRANSMISSION LOSS [dB/km] | CHROMATIC DISPERSION [ps/nm/km] | DISPERSION SLOPE [ps/nm²/km] | Aeff [$\mu$m²] | BENDING LOSS [dB/m(20 mm $\phi$)] |
|---|---|---|---|---|---|
| COMPARATIVE EXAMPLE 1 | 1.07 | 27.9 | 0.068 | 116 | 2.0 |
| EXAMPLE 1 | 1.11 | 28.3 | 0.069 | 113 | 1.8 |
| EXAMPLE 2-1 | 1.05 | 28.4 | 0.068 | 113 | 1.7 |
| EXAMPLE 2-2 | 1.06 | 28.5 | 0.068 | 114 | 1.8 |

US 7,693,378 B2

HOLEY FIBER AND METHOD OF MANUFACTURING THE SAME

BACKGROUND OF THE INVENTION

1. Field of the Invention

The present invention relates to a holey fiber and a method of manufacturing the same.

2. Description of the Related Art

A holey fiber is an optical fiber having air holes arranged in a periodic manner in a cladding region. The cladding region surrounds a core region. The cladding region has reduced average refractive index because of the presence of the air holes so that a light passes almost entirely through the core region because of the total reflection of the light.

Because the refractive index of holey fibers can be controlled by controlling various parameters of the air holes, the holey fibers can realize unique properties that can not be realized in the other optical fibers such as endlessly single mode (ESM) and anomalous dispersion at a short wavelength. The ESM means that a cut-off wavelength is not present and a light is transmitted in a single mode at all wavelengths. With the ESM, it is possible to realize an optical transmission at a high transmission speed over a broadband. For example, a result of an experiment of a dispersion-managed soliton transmission at a transmission speed of 10 Gb/s by forming an optical path of 100 kilometers by combining the holey fiber and a dispersion compensating optical fiber is disclosed in K. Kurokawa, et al., "Penalty-Free Dispersion-Managed Soliton Transmission over 100 km Low Loss PCF", Proc. OFC PDP21 (2005).

For realizing long-haul transmission, it is necessary that holey fibers have low transmission loss. For example, a holey fiber with low transmission loss of 0.28 dB/km is disclosed in K. Tajima, et al., "Low water peak photonic crystal fibers", ECOC'03 PD Th4.16 (2003).

Generally, a long optical fiber is produced by fusion splicing short optical fibers. Specifically, an end surface of one optical fiber is brought closer to an end surface of another optical fiber and then arc discharge is generated near those end surfaces whereby the optical fibers are fusion-spliced by the heat generated in the arc discharge.

However, air holes at the spliced portions may collapse due to the heat employed during fusion splicing. If the air holes collapse, the structure of the holey fiber is disturbed and it is difficult to confine light in the core region so that confinement loss increases.

One approach could be to repeatedly perform short-time discharging at a discharge intensity that does not cause collapsing of the air holes. This approach is not only time consuming but it yields a spliced portion with weaker mechanical strength.

SUMMARY OF THE INVENTION

It is an object of the present invention to at least partially solve the problems in the conventional technology.

According to an aspect of the present invention, there is provided a holey fiber that includes a core region; and a cladding region surrounding the core region and having air holes arranged around the core region; and a connection section extending from at least one end portion of the holey fiber. The refractive index of the core region in the connection section is higher than a refractive index of the cladding region without air holes in the connection section.

According to another aspect of the present invention, there is provided a method of manufacturing a holey fiber including a core region and a cladding region surrounding the core region and having air holes arranged around the core region. The method includes forming a preform with a main core rod for forming a main body of the holey fiber and a connection core rod for forming a connection section of the holey fiber, the connection core rod being extended from the main core rod, and capillary tubes surrounding each of the main core rod and the connection core rod within a jacket tube; and drawing the preform. The connection core rod has a higher refractive index than that of the capillary tubes and is arranged at an end of the preform in a longitudinal direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a table containing data of characteristics of holey fibers according to Examples 1, 2-1, 2-2, and Comparative Example 1.

DETAILED DESCRIPTION OF THE PREFERRED EMBODIMENTS

Exemplary embodiments of the present invention are explained in detail below with reference to the accompanying drawings.

In the following description, bending loss is calculated under such a condition that an optical fiber is wound 16 times at a bending diameter of 20 millimeters. Furthermore, a cut-off wavelength λc defined by International Telecommunication Union Telecommunication Standardization Sector (ITU-T) G.650.1 is employed. Other terms and methods are also used based on definitions and test methods defined by ITU-T G.650.1 unless otherwise specified in this document.

Dopants are generally added to silica glass, which is the main constituent of an optical fiber, to control refractive index of optical fibers. In this context, silica glass without a dopant is referred to as "pure silica glass" in this document. For example, when the amount of chlorine (Cl) doped into the silica glass is sufficiently small, that is, when increase in a refractive index of Cl-doped silica glass to undoped silica glass is 0.05% or less, the silica glass is considered as the pure silica glass.

Figure 1:
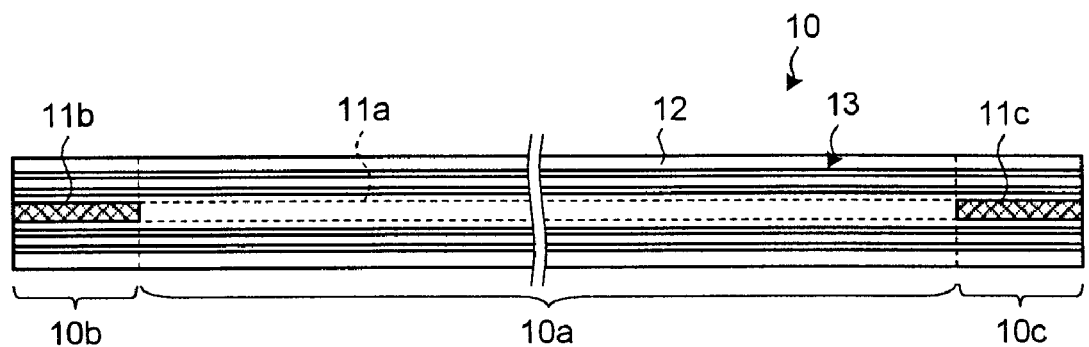
FIG. 1 is a cross section of a holey fiber according to a first embodiment of the present invention along the length of the holey fiber.

FIG. 1 is a cross section of a holey fiber 10 according to a first embodiment of the present invention. The holey fiber 10 includes a main body 10a, and a connection section 10b at one end and a connection section 10c at other end of the main body 10a. Each of the connection sections 10b and 10c has a predetermined length.

Figure 2:
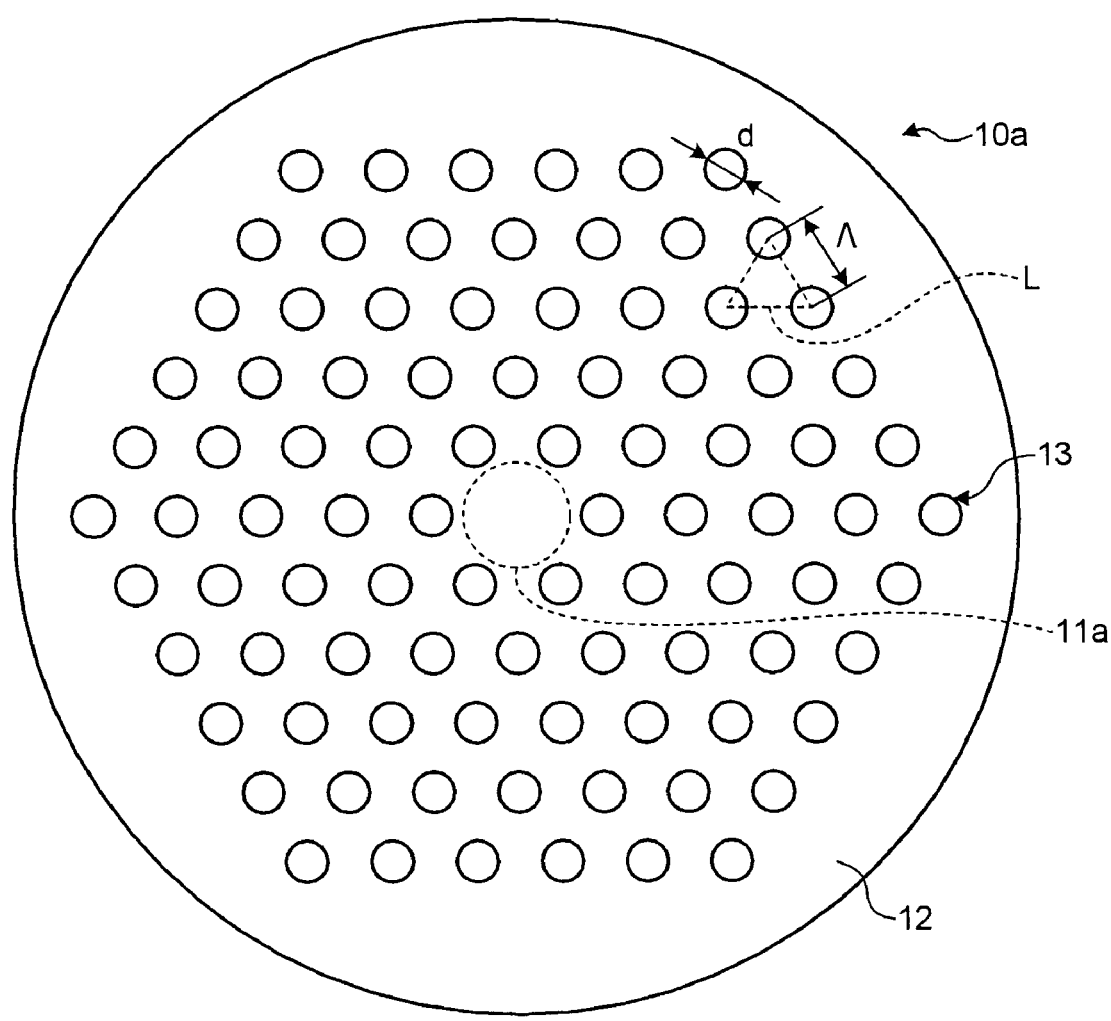
FIG. 2 is a cross section of a main body of the holey fiber shown in FIG. 1 perpendicular to the length of the holey fiber.
Figure 3:
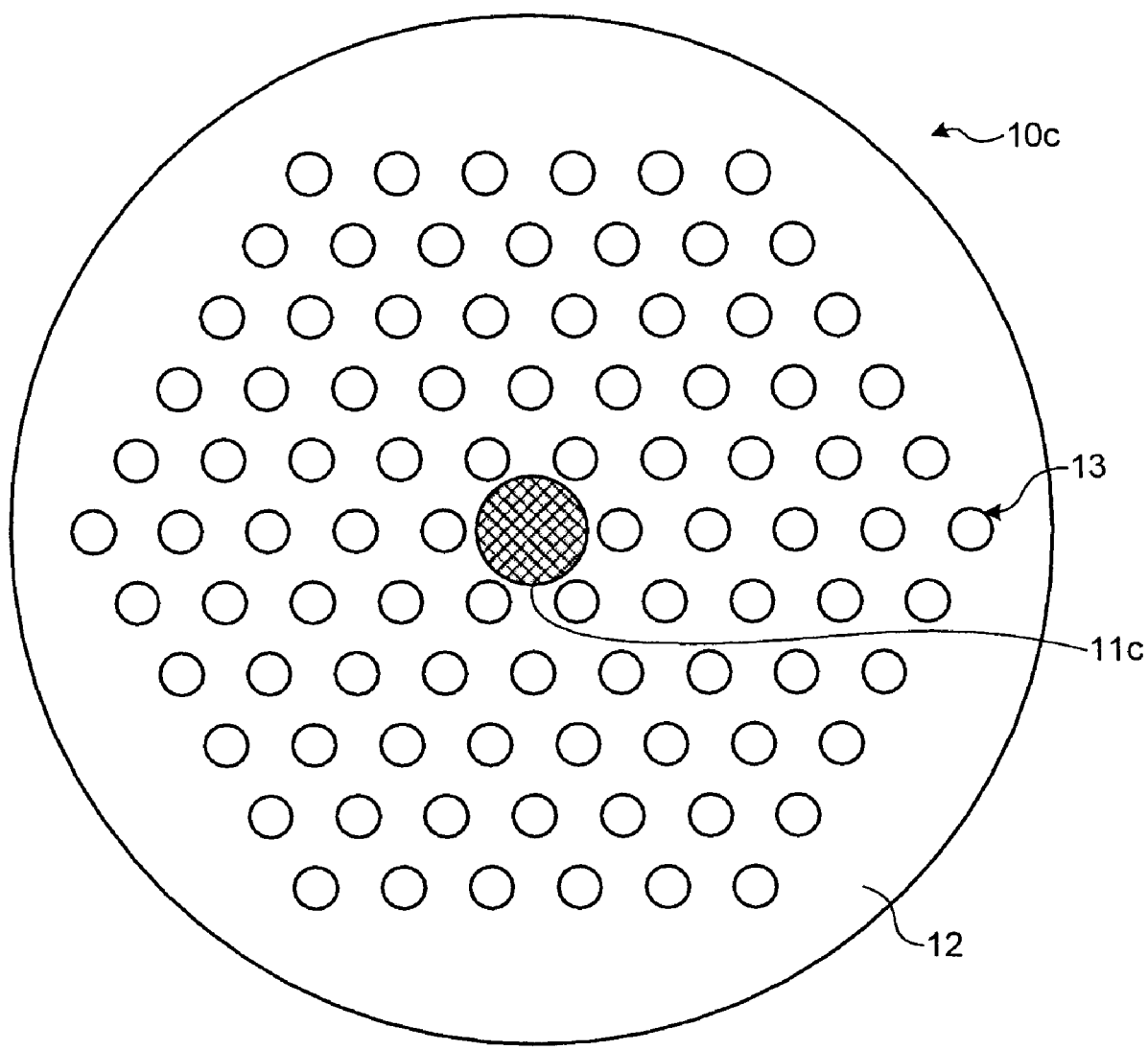
FIG. 3 is a cross section of a connection section of the holey fiber shown in FIG. 1 perpendicular to the length of the holey fiber.

FIG. 2 is a cross section of the main body 10a perpendicular to the length of the holey fiber 10, and FIG. 3 is a cross section of the connection section 10c perpendicular to the length of the holey fiber 10.

A structure of the holey fiber 10 is explained below with reference to FIGS. 1 to 3. The main body 10a includes a core region 11a and an outer cladding region 12 surrounding the core region 11a. The cladding region 12 contains air holes 13 in a layered structure. The air holes 13 are arranged in a triangular lattice L. A diameter of each of the air holes 13 is represented by "d" and a lattice constant of the triangular lattice L, that is, a pitch between centers of the air holes 13 is represented by "Λ". The values of Λ and d/Λ are designed as appropriate. In the main body 10a, desired optical characteristics including holey fiber specific characteristics such as an Endlessly Single Mode (ESM) are realized. The core region 11a and the cladding region 12 without the air holes 13 are made of pure silica glass.

As shown in FIGS. 1 and 3, the connection section 10c includes a core region 11c and the cladding region 12 surrounding the core region 11c. Thus, the cladding region 12 is present in both the main body 10a and the connection section 10c. The cladding region 12 in the connection section 10c includes the air holes 13 around the core region 11 in a layered structure. Thus, the structure of the cladding region 12 in the connection section 10c is the same as that of the cladding region 12 in the main body 10a. The air holes 13 in the connection section 10c have the same arrangement, same hole diameter, and same pitch between centers of the air holes 13 as those of the main body 10a. The connection section 10b has the same structure as that of the connection section 10c. $GeO_2$ is doped in the core region 11c so that it has a higher refractive index than that of the cladding region 12 excluding the air holes 13.

Figure 4:
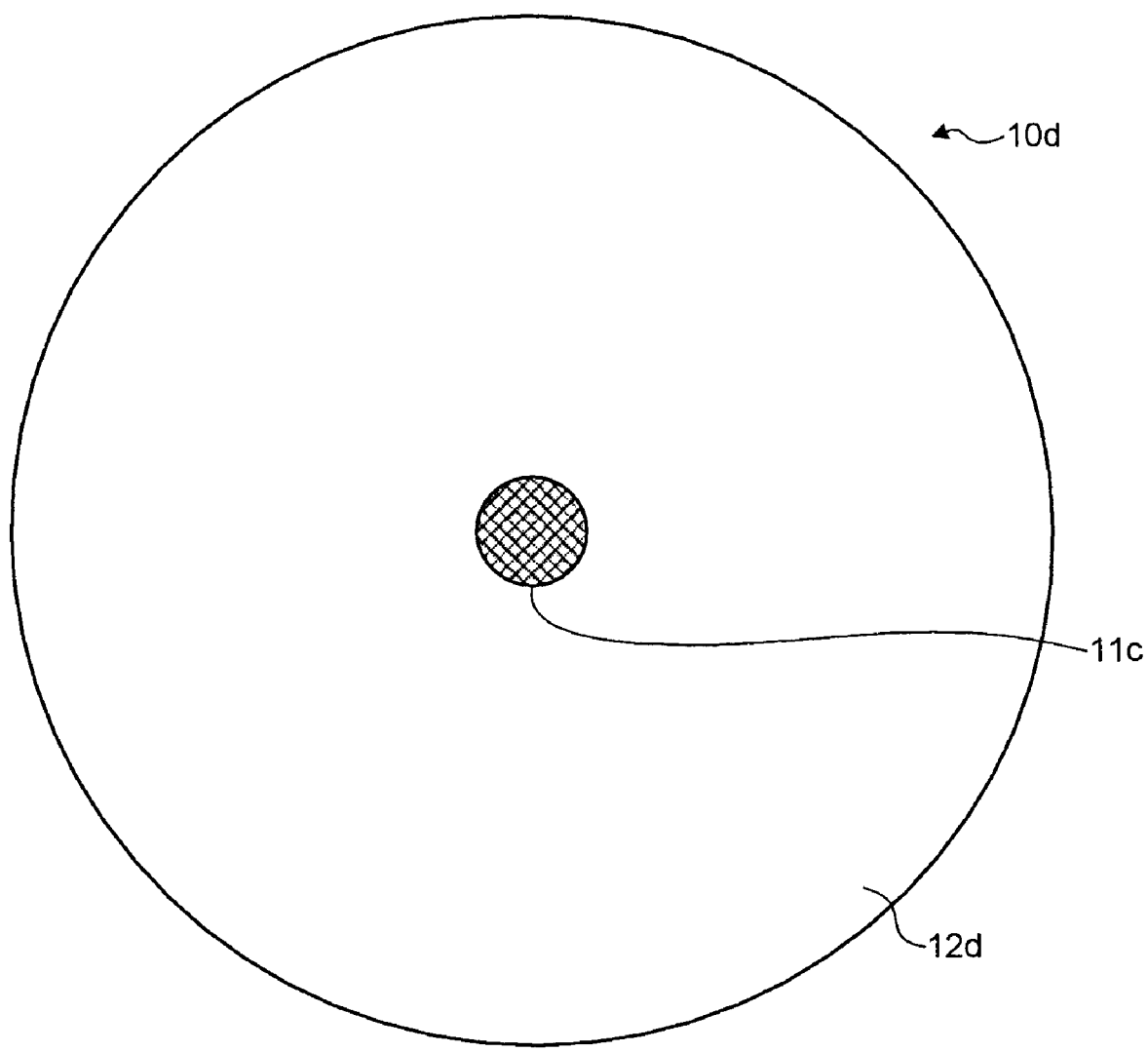
FIG. 4 is a cross section of the holey fiber shown in FIG. 1 for explaining a melted state of an arc-discharged end surface.

Given below is an explanation of what happens when the connection section 10c is subjected to arc discharge to fusion-splice the holey fiber 10 to another holey fiber. As shown in FIG. 4, air holes in the cladding region of the connection section 10c collapse due to the heat thereby producing a connection section 10d. In other words, the connection section 10d has the core region 11c and a cladding region 12d that has no air holes. Thus, the structure of the connection section 10d is similar to that of a typical optical fiber.

Because the cladding region 12d has no air holes, the refractive index of the core region 11c is higher than that of the cladding region 12d. Therefore, beams transmitted through the main body 10a are confined into the core region 11c because of the refractive index difference at the boundary of the core region 11c and the melted cladding region 12. Thus, the beams are transmitted within the core region 11c. As a result, confinement loss is suppressed. Moreover, suppression of the confinement loss leads to suppression of splice loss.

Furthermore, it is not necessary to suppress the arc discharge duration or intensity so that arc discharge can be performed for a desired duration at a desired intensity. Therefore, fusion splicing can be easily and surely performed and the mechanical strength of the spliced portions can be maintained high.

The connection section 10b has the same structure to that of the connection section 10c. Thus, splice loss can be suppressed when another optical fiber is fusion-spliced with the end surface of the connection section 10b in the above manner.

As explained above, in the holey fiber 10, when the connection section 10c (or 10b) is fusion-spliced to another optical fiber, optical beams are confined into the core region 11 because the refractive index of the core region 11 is higher than the cladding region 12d. Thus, the holey fiber 10 can be easily and surely fusion-spliced with good mechanical strength and less splice loss.

A relative refractive index difference between each of the core regions 11b and 11c to the cladding region 12 of approximately 0.1% is preferable because a splice loss can be suppressed. More specifically, the relative refractive index difference of approximately 0.4% is preferable because splice loss with a standard single mode optical fiber (SMF) having the similar relative refractive index difference can be suppressed.

In the connection sections 10b and 10c beams are confined into the core regions 11b and 11c by the relative refractive index difference between the core regions 11b and 11c and the cladding region 12. Thus, the holey fiber specific characteristics such as ESM are realized. It is preferable that the total length of the connection sections 10b and 10c relative to the entire length of the holey fiber 10 is as short as possible. If the total length of the connection sections 10b and 10c is 5% or less of the entire length of the holey fiber 10, the characteristics of the holey fiber 10 is determined by the characteristics of the main body 10a. Namely, the connection sections 10b and 10c hardly influence the characteristics of the holey fiber 10. Thus, it is preferable that the total length of the connection sections 10b and 10c is 5% or less of the entire length of the holey fiber 10.

As a second embodiment of the present invention, a method of manufacturing the holey fiber 10 is described below. The method employs a stack-and-draw method.

Figure 5:
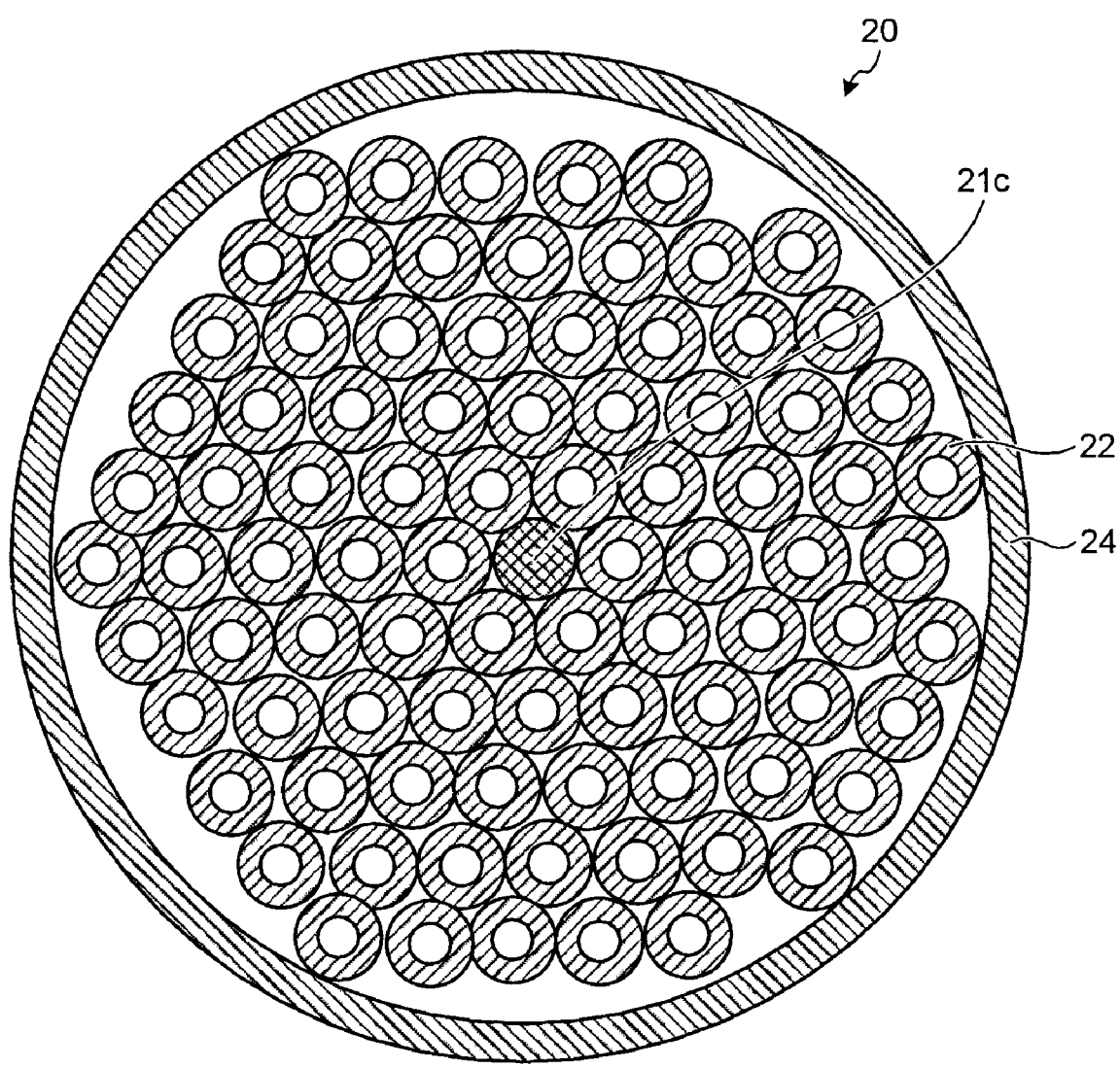
FIG. 5 is a cross section of a preform for manufacturing the holey fiber shown in FIG. 1.
Figure 6:
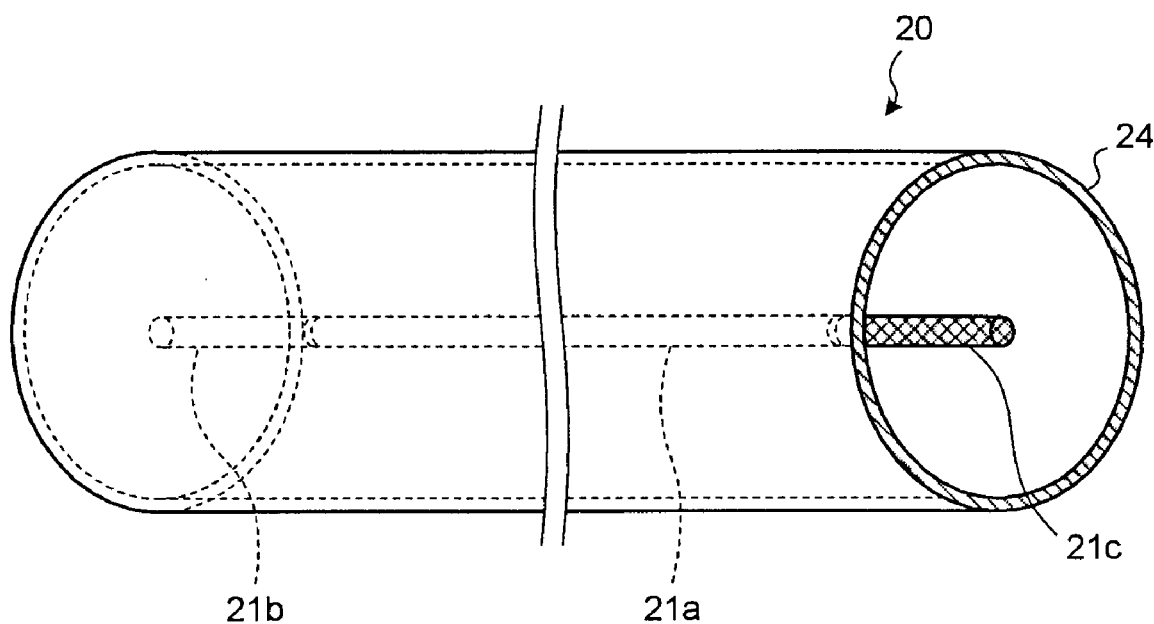
FIG. 6 is a perspective view of the preform shown in FIG. 5.

FIG. 5 is a cross section of a preform 20 for manufacturing the holey fiber 10; and FIG. 6 is a perspective view of the preform 20. Capillary tubes 22 are not shown in FIG. 6 for the convenience of an explanation. The preform 20 is formed in the following manner. A main core rod 21a for the main body 10a and connection core rods 21b and 21c for connection sections 10b and 10c are prepared. The main core rod 21a is made of pure silica glass. The connection core rods 21b and 21c are made of $GeO_2$ doped silica glass. The connection core rod 21b, the main core rod 21a, and the connection core rod 21c are arranged in that order. A bundle of the hollow capillary tubes 22 are arranged around the connection core rod 21b, the main core rod 21a, and the connection core rod 21c within a jacket tube 24. The capillary tubes 22 are made of silica glass. The refractive index of the connection core rods 21b and 21c are higher than that of the capillary tubes 22. The connection core rods 21b and 21c are located in longitudinal ends of the preform 20. The diameters or inner diameters of the connection core rods 21b and 21c, the main core rod 21a, the capillary tube 22, the jacket tube 24, and the number of the capillary tubes 22 are determined based on the diameter, the pitch, and the number of the air holes 13.

Figure 7:
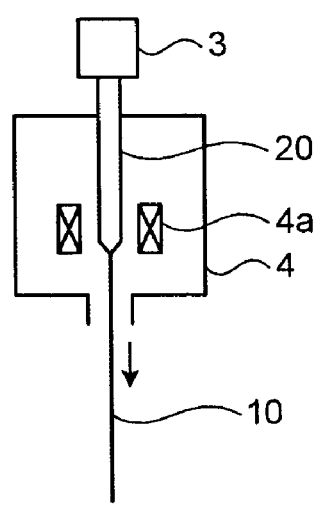
FIG. 7 is a schematic diagram of a drawing furnace according to a second embodiment of the present invention.

FIG. 7 is a schematic diagram of a drawing furnace 4 for drawing the holey fiber 10. The preform 20 is installed in the drawing furnace 4 such that the connection core rod 21c of the preform 20 positions at a lower side. The lower end of the preform 20 is heated to be closed. An open upper end of the preform 20 is connected to a gas pressure device 3. The gas pressure device 3 applies pressure to insides of the holes of the inner capillary tubes 22 to maintain shapes of the air holes. By heating and melting the lower end of the preform 20, the holey fiber 10 is drawn. In the drawn holey fiber 10, the connection core rods 21b and 21c constitute the core regions 11b and 11c of the connection sections 10b and 10c. The main core rod 21a constitutes the core region 11a of the main body 10a.

At the start of drawing, conditions, such as the heating temperature and the drawing speed of the preform 20, are regulated while the holey fiber 10 is actually drawn in a predetermined length. The portion of the holey fiber 10 that is produced while the conditions are being regulated has instable characteristic so that that portion is cut off. If the connection core rod 21c is too short, the most of the connection core rod 21c is drawn while the conditions are being regulated. As a result, the connection section 10c may not be sufficiently formed in manufacturing the holey fiber 10. At the completion of the drawing process, the upper end of the preform 20 has an undrawn portion. If the length of the connection core rod 21b is insufficient to be drawn, the connection section 10b cannot be formed in a sufficient length in the holey fiber 10.

Accordingly, when manufacturing the holey fiber 10, it is necessary to consider a length of a portion used for regulating the drawing conditions and a length of an undrawn portion. It is therefore desirable to have a sufficient margin of the connection core rods 21b and 21c for the connection sections 10b and 10c when the holey fiber 10 is drawn. After drawing, the formed connection sections 10b and 10c can be cut to appropriate lengths.

In the manufacturing method according to the second embodiment, the connection core rods are allocated on the ends of the preform. However, the connection core rods can be arranged on other portions in the preform.

Figures 8, 9:
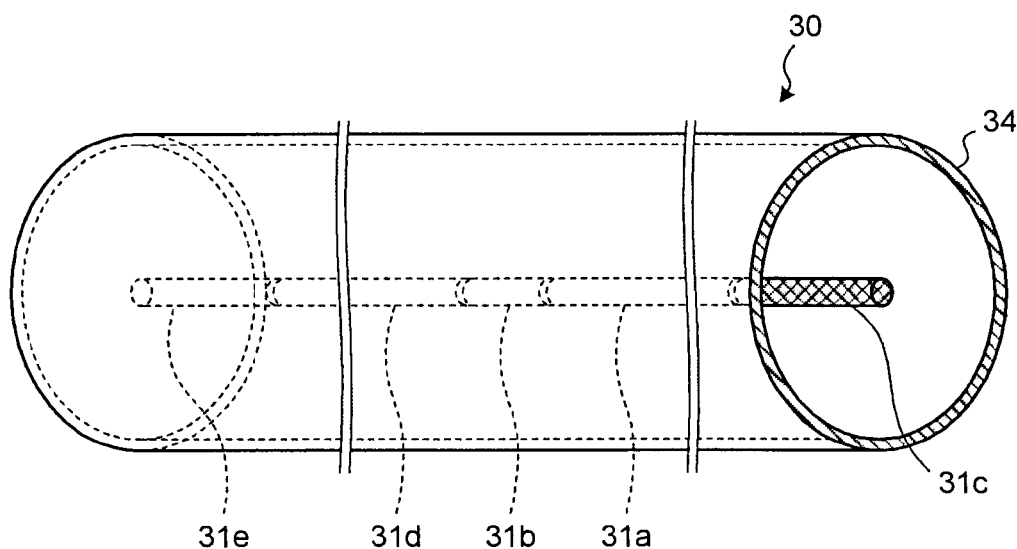
FIG. 8 is a perspective view of a preform for manufacturing a holey fiber according to the second embodiment.
FIG. 9 is a table containing data of characteristics of the holey fiber shown in FIG. 1 calculated by a Finite Element Method (FEM) simulation at a wavelength of 1550 nanometers with a parameter d/Λ of 0.50 where d is a hole diameter and Λ is an air hole pitch of 10 micrometers.

FIG. 8 is a perspective view of a preform 30 according to a modification of the second embodiment. Capillary tubes 22 are not shown in FIG. 8 for the convenience of an explanation.

To form the preform 30, main core rods 31a and 31d for a main body and connection core rods 31b, 31c, and 31e for connection sections are prepared. The main core rods 31a and 31d are made of pure silica glass. The connection core rods 31b, 31c, and 31e are made of GeO$_2$ doped silica glass. The connection core rod 31c, the main core rod 31a, the connection core rod 31b, the main core rod 31d, and the connection core rod 31e are arranged in that order. A bundle of the hollow capillary tubes 22 is arranged around the core rods 31c, 31a, 31b, 31d, and 31e within a hollow jacket tube 34. The capillary tubes 22 are made of pure silica glass. The jacket tube 34 is made of pure silica glass. The connection core rods 31b, 31c, and 31e have higher refractive index than that of the capillary tubes 22. The connection core rods 31c and 31e are located in the ends of the preform 30 and the connection core rod 31b is located in the middle of the preform 30.

Using the preform 30, a holey fiber with connection sections is drawn similarly by the method according to the second embodiment. Each of the connection sections has a core having a higher refractive index than that of a cladding region. The connection sections are formed on both ends and in the middle of the holey fiber in a longitudinal direction. When the holey fiber is cut in the middle of the connection section in the middle of the holey fiber, two holey fibers each having a connection section on both ends can be obtained. In other words, two holey fibers can be obtained in one drawing process. Therefore, high productivity of holey fibers can be attained. If four or more connection core rods are used, three or more holey fibers can be produced at a time.

As Example 1, a holey fiber having the same structure as that of the first embodiment was manufactured using the method according to the second embodiment. A main core rod for a main body, capillary tubes, and a jacket tube were made of pure silica glass. A connection core rod was made of a GeO$_2$ doped silica glass and had a relative refractive index difference of 0.4% with respect to pure silica glass. The length of the main core rod was set such that a resultant length after drawing was 10 kilometers. The length of the connection core rod was set such that a resultant length after drawing was 500 meters. The actually drawn holey fiber had a 10-kilometer-long main body and 500-meter-long connection sections on both ends of the holey fiber. The ends of the holey fiber were cut such that each of the connection sections had a length of 50 meters, i.e., 5% of 10 kilometers.

As Examples 2-1 and 2-2, a holey fiber having the same structure as that of a first embodiment was manufactured using the method according to the modification of the second embodiment. A main core rod, capillary tubes, and a jacket tube were made of pure silica glass. A connection core rod was made of a GeO$_2$ doped silica glass and had a relative refractive index difference of 0.4% with respect to pure silica glass. The length of each of the two main core rods was set such that a resultant length after drawing is 10 kilometers. A length of each of the three connection core rods was set such that a resultant length after drawing was 500 meters. In the same manner as Example 1, the actually drawn holey fiber had a 10-kilometer-long main body in the center portion and 500-meter-long connection sections on both ends of the holey fiber. The ends of the holey fibers were cut such that each of the connection sections had a length of 50 meters, i.e., 5% of 10 kilometers.

As Comparative Example 1, a holey fiber having the same structure as that of a first embodiment but without the connection sections was manufactured using the method according to the second embodiment. A main core rod, capillary tubes, and a jacket tube were made of pure silica glass. A length of the main core rod was set such that a resultant length after drawing was 10 kilometers. The actually drawn holey fiber as Comparative Example 1 had a 10-kilometer-long main body.

For the holey fibers of Examples 1, 2-1, and 2-2, an interface between the main core rod and the connection core rod is simply butt jointed. However, the butt jointed holey fiber subsequently undergoes a heat splicing process at a high temperature drawing furnace, so that the splice loss at the interface is sufficiently less. Specifically, splice losses along the length of the holey fibers of Example 1, 2-1, and 2-2 were measured by an optical time domain reflectometer (OTDR) and measured values of the losses on the interfaces were only around 0.1 decibel, which is sufficiently less.

Figure 10:
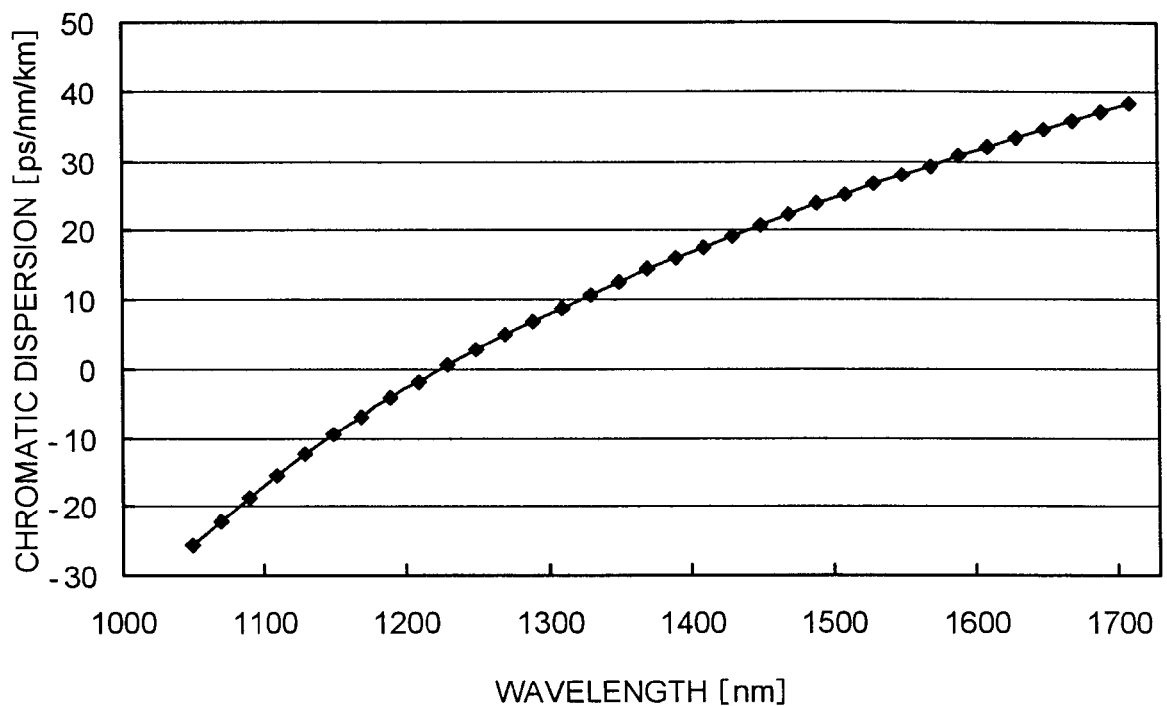
FIG. 10 is a graph of chromatic dispersion verses wavelength of the holey fiber shown in FIG. 9.
Figure 11:
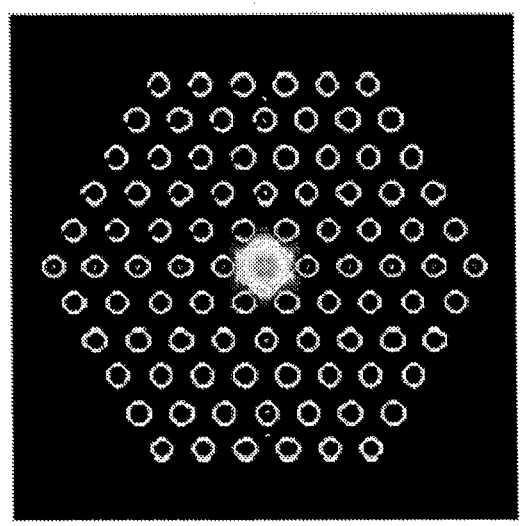
FIG. 11 is a schematic diagram of an optical field distribution in the holey fiber shown in FIG. 9.

The holey fibers of Examples and Comparative Example were manufactured with d/Λ of 0.50 and Λ of 10 micrometers where d is a diameter of the air hole and Λ is an air hole pitch. FIG. 9 is a table containing data of characteristics of the holey fiber having a structure shown in FIG. 1 calculated by a Finite Element Method (FEM) simulation at a wavelength of 1550 nanometers with d/Λ of 0.50 and Λ of 10 micrometers. Aeff shown in FIG. 9 means an effective core area. As shown in FIG. 9, the holey fiber has a relatively low chromatic dispersion value of 28 ps/nm/km, a large effective core area of 115 square micrometers, and sufficiently small bending loss. Thus, the holey fiber is suitable as an optical fiber for a transmission path. FIG. 10 is a graph of chromatic dispersion characteristics of the holey fiber shown in FIG. 9. The chromatic dispersion characteristics are similar to that of a standard single mode optical fiber. FIG. 11 is a schematic diagram of an optical field distribution (electric field x-component (Ex) distribution) in a cross section of the holey fiber shown in FIG. 9. The field distribution corresponds to a Gaussian field distribution with the core region as a center point.

The characteristics of the holey fiber of Example 1 and Comparative Example 1 are described below. FIG. 12 is a table containing measurement data for explaining characteristics of holey fibers according to Examples 1, 2-1, 2-2, and Comparative Example 1. The characteristics were measured at a wavelength of 1550 nanometers. As can be seen from FIG. 12, although each of the holey fibers according to Examples 1, 2-1, and 2-2 had a connection section with a core having a higher refractive index than that of a cladding region, the characteristics of the holey fibers having the connection sections (Examples 1, 2-1, and 2-2) were at the same level as that of the holey fiber without a connection section (Comparative Example 1). Furthermore, the characteristics were substantially the same as those shown in FIG. 9.

Measurement results of splice losses by fusion splicing of the holey fibers of the above Examples 1, 2-1, and 2-2, and Comparative Example 1 with a standard SMF is explained below. Each of the holey fibers was fusion-spliced with a standard SMF for 10 times and the average value was calculated as the confinement loss. For the splicing, a general fusion splicer was used. As the splicing conditions, a relatively high discharge intensity typically used for splicing a standard SMF with other standard SMF was used. As a result, the holey fiber of Comparative Example 1 had a relatively high splice loss of 1.64 decibels. On the other hand, the holey fiber of Example 1 had a splice loss of 0.21 decibel. The holey fibers of Examples 2-1 and 2-2 had 0.18 decibel and 0.19 decibel, respectively. Thus, it is verified that the holey fibers having connection sections can be spliced with other optical fibers with low splice losses. Furthermore, the mechanical strength of the connection sections of the holey fibers are verified that it is at a sufficient level similarly to fusion-spliced standard SMFs.

In the above embodiments, $GeO_2$ is doped in the core region at the connection section. However, other dopants can be used. Instead of doping to the core region, dopant, such as fluorine, can be doped in the cladding region to make the refractive index of the core region higher than that of the cladding region.

Although manufacturing the holey fiber 10 by a stack and draw method is described above for forming the preform 20, a drill method, or a sol-gel method can be use for forming the preform 20. By the drill method, for example, glass rods for forming connection sections can be integrally spliced with both ends of the glass rod for forming a main body having a constant refractive index. In this state, the glass rods for forming connection sections have a core having the higher refractive index than that of the cladding region. Then, the integrated glass rod is drilled to form layered air holes while the drilling is not performed on the core region and thereby the preform is completed. As an alternative drill method, the glass rods for forming connection sections and having a higher refractive index than that of the main core rod can be integrally spliced with both ends of the glass rod for forming a main body having a constant refractive index. Then, the cladding region having the same refractive index as the main core rod is externally formed on a periphery of the integrally formed core rod. The formed cladding region is subsequently drilled to form layered air holes and thereby the preform is completed.

According to an aspect of the present invention, even if air holes in the cladding region on the end surface collapse by fusion splicing of holey fibers, the holey fiber still has a structure that confines beams in the core region, which leads to maintaining a high mechanical strength and low splice loss. It is therefore possible to easily splice holey fibers with low transmission losses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A holey fiber comprising:
   a core region; and
   a cladding region surrounding the core region and having air holes arranged around the core region; and
   a connection section extending from at least one end portion of the holey fiber, wherein
   a refractive index of the core region is same as a refractive index of the cladding region except the air holes, and
   only the refractive index of the core region in the connection section is higher than a refractive index of the cladding region without air holes in the connection section.

2. The holey fiber according to claim 1, wherein a relative refractive index difference between the core region and the cladding region without air holes in the connection section is greater than 0.1%.

3. The holey fiber according to claim 1, wherein the core region is doped with $GeO_2$.

4. The holey fiber according to claim 1, wherein the cladding region without air holes in the connection section is made of pure silica glass.

5. The holey fiber according to claim 1, wherein the holey fiber includes two connection sections, and a total length of the two connection sections in an entire length of the holey fiber including the two connection sections is 5% or less.

6. A method of manufacturing a holey fiber including a core region and a cladding region surrounding the core region and having air holes arranged around the core region, the method comprising:
   forming a preform with a main core rod for forming a main body of the holey fiber and a connection core rod for forming a connection section of the holey fiber, the connection core rod being extended from the main core rod, and capillary tubes surrounding each of the main core rod and the connection core rod within a jacket tube; and
   drawing the preform, wherein
   a refractive index of the core region is same as a refractive index of the cladding region except the air holes,
   only the refractive index of the core region in the connection section is higher than a refractive index of the cladding region without air holes in the connection section, and
   the connection core rod has a higher refractive index than that of the capillary tubes and is arranged at an end of the preform in a longitudinal direction.

* * * * *